Nov. 19, 1929.  E. J. RODIER  1,736,277
GEAR CHANGING MECHANISM
Filed April 5, 1928  3 Sheets-Sheet 1

INVENTOR
Edward J. Rodier
BY
ATTORNEYS.

Nov. 19, 1929.  E. J. RODIER  1,736,277

GEAR CHANGING MECHANISM

Filed April 5, 1928  3 Sheets-Sheet 2

WITNESS:

INVENTOR
Edward J. Rodier
BY
ATTORNEYS.

Nov. 19, 1929.   E. J. RODIER   1,736,277

GEAR CHANGING MECHANISM

Filed April 5, 1928   3 Sheets-Sheet 3

WITNESS:

INVENTOR
Edward J. Rodier
BY
ATTORNEYS.

Patented Nov. 19, 1929

1,736,277

UNITED STATES PATENT OFFICE

EDWARD J. RODIER, OF GLENOLDEN, PENNSYLVANIA, ASSIGNOR TO LEWIS MANUFACTURING COMPANY, OF PHILADELPHIA, PENNSYLVANIA, A CORPORATION OF PENNSYLVANIA

GEAR-CHANGING MECHANISM

Application filed April 5, 1928. Serial No. 267,562.

This invention relates to a mechanically operated gear changing mechanism of the type illustrated in patent No. 1,264,403, granted to Dean C. Lewis, dated April 30, 1918.

The mechanism shown in the above patent comprises a series of cams mounted on a shaft, the position of which is controlled by the operator, which cams predetermine the gears thrown into mesh upon depression of the clutch pedal to disengage the clutch.

The object of the present invention may be broadly stated to be the simplification of the mechanism of the patent referred to. More specifically, some of the objects are the provisions of improved adjusting means, an improved interlocking arrangement for preventing the simultaneous meshing of two pairs of gears, direct connections between the gear shifting mechanism and the gears, and more direct coaction between the selector cams and the dogs which lock together the driving and driven hubs shown in the said patent, and an improved means for insuring positive selection.

Other objects and advantages of the invention will be apparent from the following description read in conjunction with the accompanying drawings in which.

A casting 2 provides a housing for the operating parts of the gear changing mechanism and is formed with suitable bearings and guideways for the various elements. Slidably mounted for longitudinal movement within the housing are a pair of rods 4 and 6 respectively carrying depending yokes 8 and 10, each of which is engageable within a groove formed in the hub of a pair of sliding gears contained within casing 11. These gears may be of any suitable type arranged for selective engagement to impart the usual three speeds forward and reverse to the rear wheels of the car. It will be obvious, however, as the description proceeds, that more than four speeds may be provided by a simple extension of the design of the mechanism described which, for the sake of clearness, is shown as providing a selection of the four speeds noted.

Figure 1:
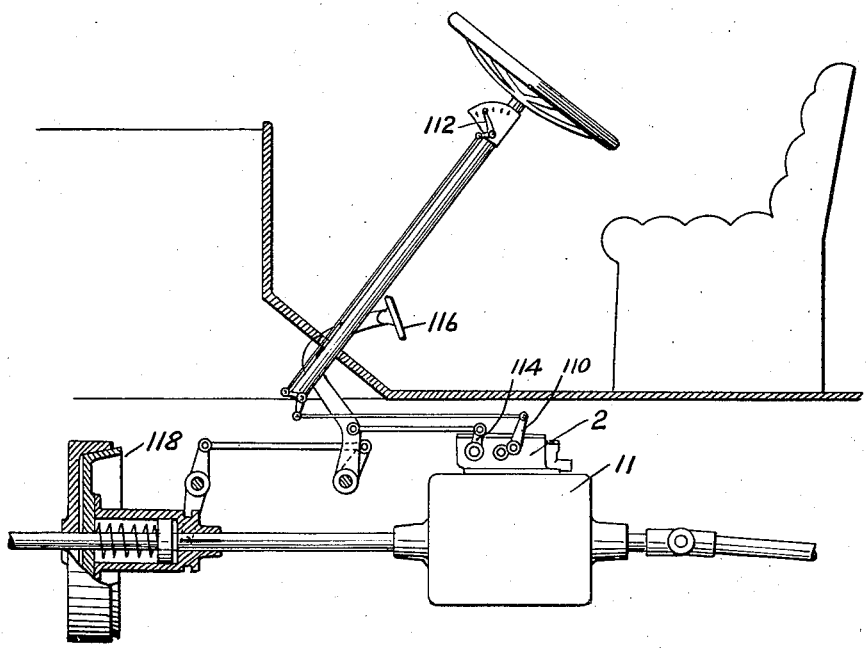
Fig. 1 is a diagrammatic section through an automobile illustrating the connections between various operating parts.

As shown in Fig. 1, the top of housing 2 is provided with a cover, and since its open bottom is secured to the open top of the gear casing a closed transmission unit is provided which is dust and dirt proof.

Yoke 8 is provided with a fork embracing a tooth 12 extending downwardly from a hub 14. Similarly yoke 10 is provided with a fork embracing a tooth 16 carried by a hub 18. Hubs 14 and 18 are loosely mounted on a shaft 20 journalled in the casing.

Figure 2:
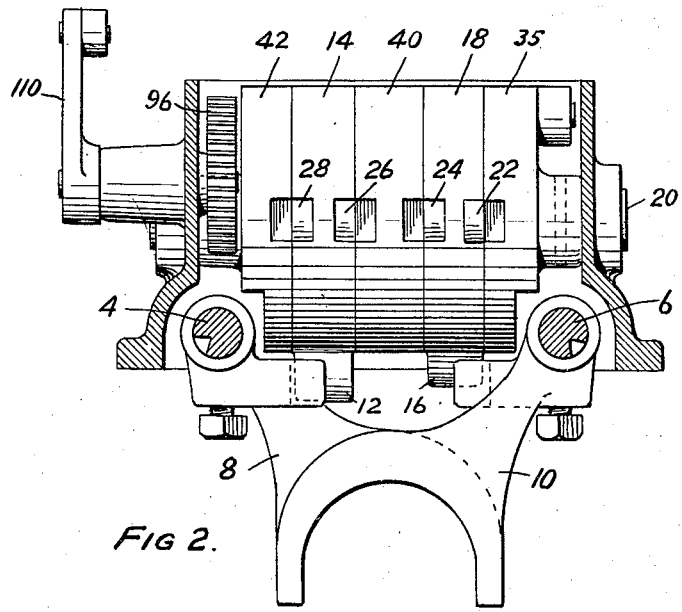
Fig. 2 is a vertical section on line 2—2 of Fig. 5.
Figure 3:
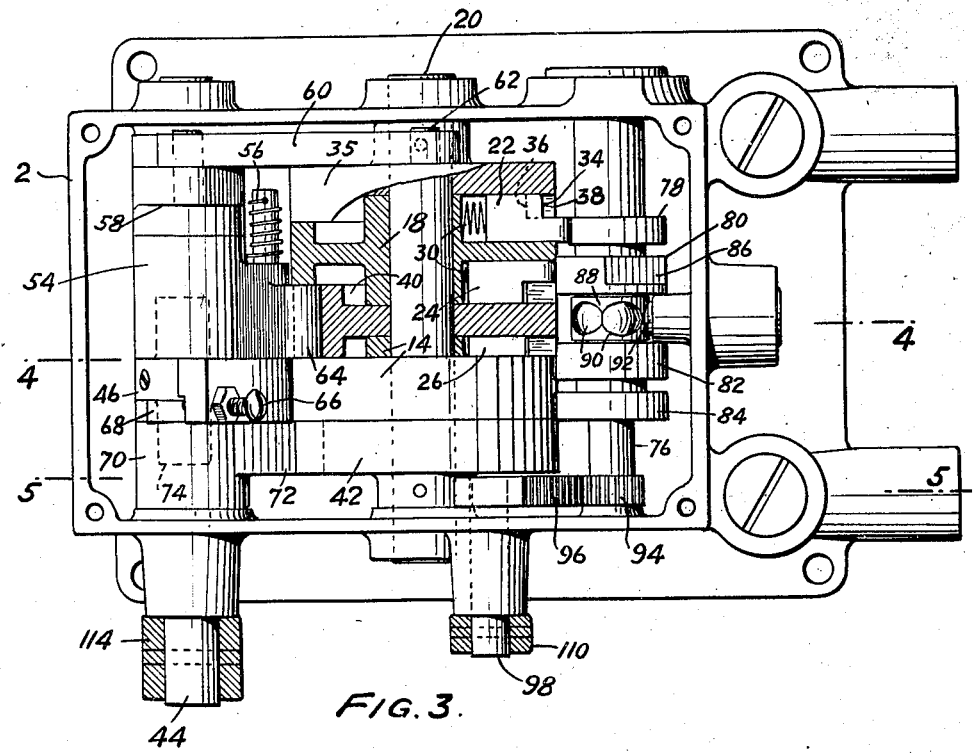
Fig. 3 is a plan view, partly in section, of the gear changing mechanism.
Figure 4:
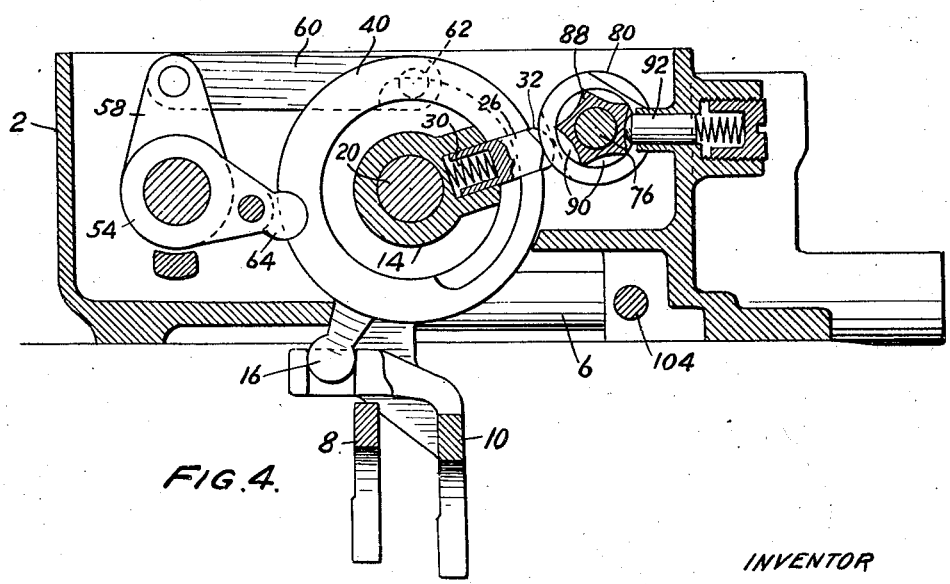
Fig. 4 is a vertical section on line 4—4 of Fig. 3.

Hub 18 is provided with radial recesses disposed on opposite faces thereof, as indicated in Fig. 2, in which are slidably mounted dogs 22 and 24. Similar dogs 26 and 28 are mounted in hub 14 in the same manner. Each of these dogs, as more clearly shown in Fig. 4, is provided with an inner recess in which is positioned a coiled spring 30 tending, by its reaction with the dog and the bottom of the recess in the hub, to press the dog outwardly. As illustrated in Fig. 3, each of hubs 14 and 18 has a flanged periphery, while each is provided with an inner hub portion extending beyond the axial limits of the periphery. The portion of each dog which is located within the axial limit of a hub is provided with a nose portion 32. The portion of the dog positioned outside the axial limit of the periphery is recessed as shown at 34.

Adjacent hub 18 in the side thereof carrying dog 22, is provided a disk member 35 carrying a flange 36, which projects over the hub portion of hub 18 and into contact with the peripheral flange thereof. Flange 36 is cut away at 38 in order to permit the outward passage of portion 34 of the dog. Portion 34 normally retains the dog in inward position by reason of its engagement with the inner side of flange 36.

A central disk member 40, provided with a plurality of flanges similar to the flange of disk member 35 is positioned between hubs 14 and 18, the flanges thereof coacting respectively with dogs 24 and 26. Another disk member 42 is positioned adjacent hub 14 to coact with dog 28. The specific constructions of these hubs and disk members are more fully described in the patent to Lewis referred to above and reference is therefore made to said patent for more complete description.

Disk member 40 is loosely mounted on shaft 20, while disk members 35 and 42 are fixedly secured thereto. Journalled in the housing in parallel relationship to shaft 20 is a shaft 44. Shaft 44 carries fixedly a collar 46 provided with a projection 48, shown in Fig. 5. A pawl 50 having a portion 52 arranged for engagement with projection 48 is pivotally carried by a hub 54, loosely mounted on shaft 44, and is normally pressed into engagement with collar 46 by means of a spiral spring 56 wound about a stub shaft by which the pawl is carried. Hub 54 carries a crank arm 58 to which one end of a link 60 is pivoted. The other end of link 60 is pivoted to disk member 35 at 62. Hub 54 is provided with a tooth 64 engaging within a slot in the periphery of disk member 40. It will be observed that by the connections described, when hub 54 is rocked in one direction, disk members 35 and 42, which are secured to shaft 20, will be rocked in the same direction by means of link 60. At the same time disk member 40 will be rocked in an opposite direction by means of tooth 64.

Figure 5:
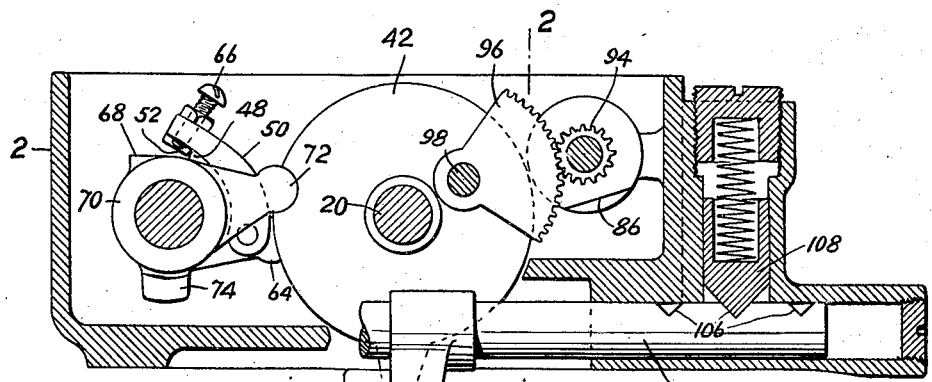
Fig. 5 is a section on line 5—5 of Fig. 3.
Figure 6:
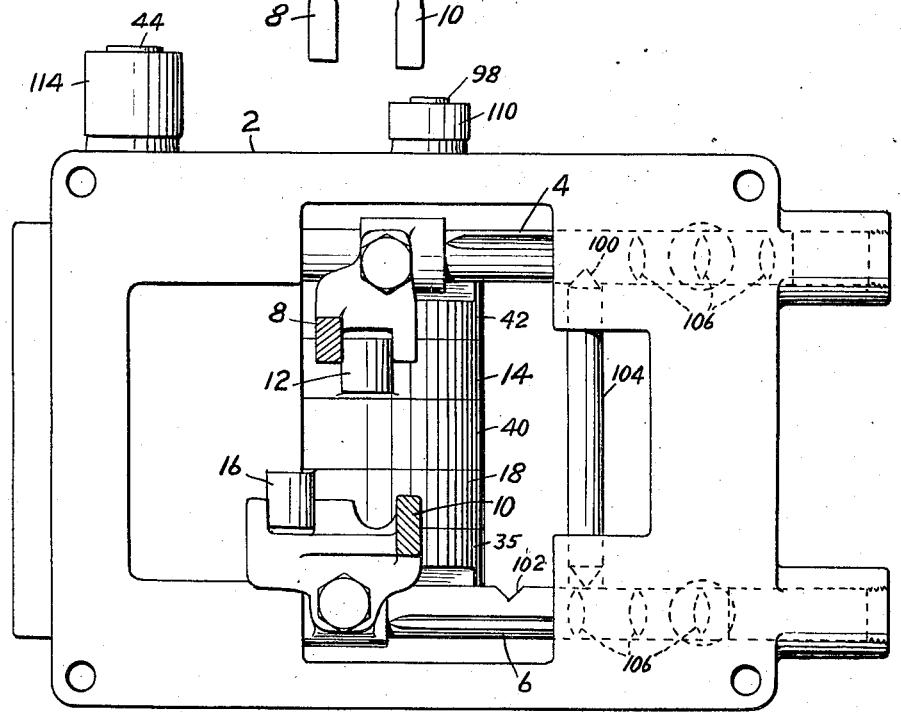
Fig. 6 is a bottom view of the gear changing mechanism, partly in section.

Pawl 50 is provided with an adjustable screw 66, threaded therethrough and projecting beyond its lower surface, as shown in Fig. 5. Screw 66 is provided with a lock nut to prevent its turning after being set to adjusted position. Screw 66 overlies a cam 68, forming a part of a hub 70 loosely mounted on shaft 44, which hub is provided with a tooth 72 engageable within a slot in disk member 42.

In the operation of shifting gears, upon depression of the clutch pedal, shaft 44 is rocked in a counter-clockwise direction, as viewed in Fig. 5. During the first portion of this counter-clockwise movement, projection 48 engages end 52 of pawl 50 and thereby rocks hub 54 in a counter-clockwise direction with shaft 44. As this counter-clockwise motion proceeds, disk member 42 receives a similar counter-clockwise motion and through its engagement with tooth 72 rocks hub 70 in a clockwise direction. In this way, cam 68 is brought into contact with the lower end of screw 66 and eventually liberates pawl 50 from engagement with projection 48. Upon further counter-clockwise movement of shaft 44 thereafter, no further counter-clockwise movement will be imparted to hub 54. A projecting member 74 carried by collar 46 will now contact with the lower portion of tooth 72 and will impart a counter-clockwise movement to tooth 72 and therefore disk member 42 will be given a clockwise movement. Thus it will be seen that a single counter-clockwise movement of shaft 44 imparts first a counter-clockwise movement to disk members 35 and 42 and thereafter a clockwise movement to the same disk members. A suitable stop may be provided either in the mechanism or outside thereof to limit the counter-clockwise movement of shaft 44.

Shaft 44 is capable of an extent of clockwise movement which carries projection 48 considerably to the right of end 52 of pawl 50. Thus shaft 44 may be directly connected to the clutch pedal, the first portion of the movement of which will serve to disengage the clutch, this movement occurring during the operation in which shaft 44 is moved to bring 48 into its first engagement with end 52.

A shaft 76 mounted in parallelism with shaft 20 carries a series of cams 78, 80, 82 and 84. Each of these cams is generally circular in shape but is provided with a chordal portion 86. These chordal portions 86 are spaced about the cams at different fifths of the circumference of the shaft. It will thus be observed that for four of the fifths of a turn imparted to shaft 76, one of the chordal portions will be brought adjacent the dogs. At the other fifth turn all of the cams will present circular portions of their peripheries to the dogs. Each of these cams is so related to its respective dog that when its circular peripheral portion is presented to the dog, the portion 32 of the dog is engaged thereby and the dog is depressed with ledge 34 within its cooperating flange 36. On the other hand, when the chordal portion is presented to a dog, the dog is free to ride outwardly, so that ledge 34 rides within the cut out portion 38 of the flange. A hub 88, secured to shaft 76, is provided with five equally spaced depressions 90 into which the end of a spring-pressed plunger 92 projects. Thus shaft 76 is releasably latched in the selected one of its five positions, plunger 92 riding out of the depressions 90 when motion is imparted forcibly to shaft 76. It will be noted that the depressions meet each other to form relatively sharp edges. By this construction, as soon as one of such edges passes to one side or the other of the center line of the plunger the rounded end of the plunger rides into the depression, forcing the cam shaft around to positively position the desired chordal portion of a cam for cooperation with a dog. A pinion 94 secured to the end of shaft 76 meshes with a segment 96 carried by a stub shaft 98.

A consideration of the prior patent referred to will render clear the operation of the present mechanism. During the counter-clockwise movement imparted to disk members 35 and 42 and the clockwise movement imparted at the same time to disk member 40, the dogs and cut away portions 38 of the various members mounted on or about shaft 20 are brought into the positions illustrated in Fig. 2, at which time the dogs are in position to be engaged by the cams on shaft 76. At this time, either three or all of the cams will present their circular peripheries to the dogs, while one of the cams may present a chordal portion. If such chordal portion is presented, the dog corresponding thereto will ride outwardly and latch either hub 14 or hub 18 with one of the disk members. The position described is neutral, that is, all of the gears are out of mesh. Upon further counter-clockwise movement of shaft 44, and consequent reversal of movement of the disk members, the latched hub and disk member will rotate together, thereby bringing the selected pair of gears into mesh. Flanges 34 will ride over the ledges of the other dogs and consequently the other disk members will be unsecured to the hubs. Any suitable means may be provided to prevent the dogs from moving completely beyond the peripheries of the hubs as, for example, by means of a small ledge engaging the lower portion of a flange 36 when the dog is in the extreme outermost position which is desirable.

Rods 4 and 6 are respectively provided with notches 100 and 102 into which the tapered ends of a rod 104 mounted therebetween in the housing, may project. Rod 104 is of such length that if one of the rods is free to move by reason of the disengagement of the end of 104 from the notch therein, the other rod must necessarily be engaged by the end of rod 104. When either of the notches is engaged by the rod, the rod carrying the engaged notch is in its neutral position; consequently, it is impossible for two pairs of gears to be in mesh at the same time.

In order to insure against either of the rods accidentally moving out of position, notches 106 are provided therein engageable by the tapered ends of spring pressed plungers 108, which serve to releasably latch the rods in one of their three possible operative positions.

A crank arm 110 is secured to stub shaft 98. Stub shaft 98 is movable upon movement of a selector arm 112 mounted on the supporting post of the automobile by means of suitable links and levers connected to a crank arm 110, as shown in Fig. 1. A crank arm 114 secured to shaft 44 is connected by a link with clutch pedal 116, which is connected, as conventionally shown in Fig. 1, to a clutch 118.

By setting selector arm 112, the cam shaft is rotated to the desired position. Upon depression of clutch pedal 116, the clutch is first disengaged and then the disk members are rotated to shift the gears in the manner described above. A subsequent release of the clutch pedal does not impart any movement to the gear changing mechanism but serves merely to permit the engagement of the clutch members under the action of a clutch spring.

It will be obvious from the description that another set or sets of disk members or hubs may be provided to actuate further gear shifting yokes so that more than four speeds may be given to the automobile.

While there has not been described in this case for the sake of clearness the provision for an emergency shift into reverse without giving the car a forward movement, it will be obvious that the mechanism described in the Lewis patent referred to may be incorporated into the present mechanism without any material change.

Having now fully described my invention, what I claim and desire to protect by Letters Patent is:

1. In a gear changing mechanism, a rotatable gear shifting member, a second rotatable member, means operable to couple said members, clutch shifting mechanism, and connections between said second rotatable member and the clutch shifting mechanism whereby the operation of the clutch shifting mechanism rotates said second rotatable member, said connections including a pawl, a member engageable with the pawl, a cam, and a follower for the cam carried by the pawl and adjustable relatively thereto, said cam being operative to release the pawl from the member engageable therewith at a predetermined period in the movement of the second rotatable member determined by the adjustment of the follower.

2. In a gear shifting mechanism, a rotatable gear shifting member, a second rotatable member, a dog radially slidable in one of said members and arranged to couple said members when in outer position, a spring urging said dog outwardly, and a manually controlled rotatable cam arranged to engage said dog to determine coupling or uncoupling of said members.

In testimony of which invention, I have hereunto set my hand, at Philadelphia, Pennsylvania, on this third day of April, 1928.

EDWARD J. RODIER.